United States Patent
Nilsson et al.

(10) Patent No.: US 10,784,912 B2
(45) Date of Patent: *Sep. 22, 2020

(54) WIRELESS COMMUNICATION DEVICE

(71) Applicant: Telefonaktiebolaget LM Ericsson (publ), Stockholm (SE)

(72) Inventors: Andreas Nilsson, Gothenburg (SE); Anders Derneryd, Gothenburg (SE); Anders Stjernman, Lindome (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/730,239

(22) Filed: Dec. 30, 2019

(65) Prior Publication Data

US 2020/0136666 A1 Apr. 30, 2020

Related U.S. Application Data

(63) Continuation of application No. 14/730,120, filed on Jun. 3, 2015, now Pat. No. 10,530,410, which is a continuation of application No. 13/984,477, filed as application No. PCT/EP2011/051820 on Feb. 8, 2011, now abandoned.

(51) Int. Cl.
*G06F 3/038* (2013.01)
*H04B 1/38* (2015.01)
*H04B 1/3827* (2015.01)
*G06F 1/16* (2006.01)

(52) U.S. Cl.
CPC ............ *H04B 1/38* (2013.01); *G06F 1/1698* (2013.01); *H04B 1/3838* (2013.01)

(58) Field of Classification Search
None
See application file for complete search history.

(56) References Cited

U.S. PATENT DOCUMENTS

| | | | |
|---|---|---|---|
| 2002/0094789 A1 | 7/2002 | Harano | |
| 2006/0205368 A1 | 9/2006 | Bustamante et al. | |
| 2007/0252827 A1 | 11/2007 | Hirota | |
| 2008/0085736 A1 | 4/2008 | Kitamura et al. | |

FOREIGN PATENT DOCUMENTS

| | | |
|---|---|---|
| CN | 1728591 A | 2/2006 |
| EP | 1 211 749 A1 | 6/2002 |

OTHER PUBLICATIONS

Office Action dated May 26, 2014, issued in Chinese Patent Application No. 201180067083.0, 12 pages.
Second Office Action dated Jan. 14, 2015, issued in Chinese Patent Application No. 201180067083.0, 10 pages.
Office Action, in corresponding Chinese Application No. 201180067083.0, dated Jul. 9, 2015, 4 pages.
Indian Examination Report dated Dec. 21, 2018, issued in Indian Patent Application No. 2289/KOLNP/2013, along with English translation, 6 pages.

*Primary Examiner* — Gary Lafontant
(74) *Attorney, Agent, or Firm* — Rothwell, Figg, Ernst & Manbeck, P.C.

(57) ABSTRACT

The invention relates to a wireless communication device 1 having an upper part 10 and a bottom part 11, the upper part 10 comprising one or more transmission antenna device(s) 12*a*, 12*b*; 15. The upper part 10 and the bottom part 11 are arranged movably in relation to each other, so that the bottom part 11, in use mode, is closer to the user than the upper part 10. The bottom part 11 comprises one or more reception antenna device(s) 14*a*, 14*b*, 14*c*, 14*d*.

7 Claims, 1 Drawing Sheet

WIRELESS COMMUNICATION DEVICE

CROSS REFERENCE TO RELATED APPLICATION(S)

This application is a continuation of Ser. No. 14/730,120, filed Jun. 3, 2015, which is a continuation of, and claims priority to, U.S. application Ser. No. 13/984,477, entitled "Wireless communication device", filed Aug. 8, 2013, which was a 35 U.S.C. § 371 National Phase Entry Application from PCT/EP2011/051820, filed Feb. 8, 2011, designating the United States. The content of these applications are incorporated in their entirety by reference.

FIELD OF THE INVENTION

The invention relates to wireless communication devices, and in particular to wireless communication devices having an upper part and a bottom part arranged movably in relation to each other.

BACKGROUND OF THE INVENTION

Wireless communication devices, such as mobile phones and laptops, are an expected part of everyday life, and an increasing number of services are offered to users of these wireless communication devices. Examples of such services comprise video on demand, e-mail, downloading of music and surfing the Internet, just to mention a few. The provided services become increasingly more bandwidth requiring and the number of users is also increasing. Further, higher data rates for the services are a desire of both users as well as of the service providers, enabling a rapid exchange of data.

In view of e.g. the vast number of services being offered, the need and demand for increased data rates and bandwidth is most understandable. However, increased data rates put requirements on e.g. the antennas used. An increase in antenna size is difficult in view of the size of the wireless portable device, and an increase in transmission power is difficult for a number of reasons. Besides interference issues, Specific Absorption Rate (SAR) measurements need to be performed under certain conditions. If the transmit antennas are placed sufficiently far away from the users, there is no requirement for the manufacturers of the wireless communication devices to measure SAR. Otherwise, such SAR measurements need to be performed for every antenna implementation, which would be very costly and also time-consuming for the manufacturers.

From the above, it is clear that there is a need for improvements on this situation in this field of technology.

SUMMARY OF THE INVENTION

An object of the invention is to enable an increase of data rates in wireless communication devices.

The object is according to an aspect of the invention achieved by a wireless communication device having an upper part and a bottom part. The upper part comprises one or more transmission antenna device(s). The upper part and the bottom part are arranged movably in relation to each other, so that the bottom part, in use mode, is closer to the user than the upper part, and the bottom part comprises one or more reception antenna device(s). By placing reception antenna devices in the part closest to the user when using the portable wireless communication device, an increased reception capacity is provided without entailing any requirements for performing SAR measurements. Further, the placement of the reception antenna device(s) in the bottom part enables the reduction of losses as required cables between reception antennas and radio circuitry can be shortened, thereby increasing the received signal to noise and interference ratio.

In an embodiment of the invention, the upper part further comprises one or more reception antenna device. This is the case for many wireless communication devices, and the provision of additional reception antenna devices in the bottom part provides an increased reception capacity to such wireless communication devices.

In a variation of the above embodiment, the bottom part comprises one or more reception antenna devices arranged to receive a polarization orthogonal to the polarization of the one or more reception antenna devices of the upper part. An improved reception is provided in that an additional polarization direction can be used therefore.

In another embodiment of the invention, the one or more reception antenna device(s) comprise a microstrip antenna such as a planar inverted F antenna or a rectangular patch antenna. Depending on the wireless communication device at hand, different antenna types may be used.

In another embodiment of the invention, the reception antenna device(s) and the transmission antenna device(s) operate in a cellular communication frequency band.

In another embodiment of the invention, the upper part and the bottom part are pivotally or slidably fastened to each other.

In another embodiment of the invention, the upper part comprises the lid of a laptop and the bottom part comprises the user input device of the laptop.

In another embodiment of the invention, the upper part, in use mode, is at a distance from the user at which no SAR measurements are required. The manufacturer of the portable wireless communication device does not need to perform costly and time-consuming SAR measurements and an increased data rate can be provided, without the need for such SAR measurements.

In different variations, the wireless communication device comprises a laptop, a notebook computer or a pocket personal computer.

Further features and advantages thereof will become clear upon reading the following detailed description and the accompanying drawings.

DETAILED DESCRIPTION OF EMBODIMENTS

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Like numbers refer to like elements throughout the description.

Figure 1:
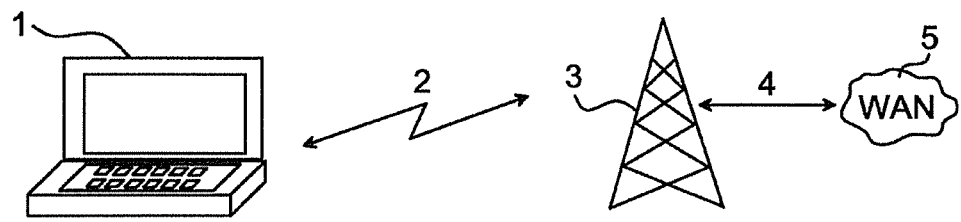
FIG. 1 illustrates an exemplary environment in which an embodiment of the invention may be implemented.

FIG. 1 illustrates an exemplary environment in which an embodiment of the invention may be implemented. A wireless communication device 1 is able to communicate with other devices and comprises for this end data exchanging means able to receive and transmit data. The communication is performed over a wireless communication link, schematically illustrated at reference numeral 2. The communication link 2 may for example comprise a channel in a cellular radio network and a radio access node 3, e.g. base station, is then provided. The radio access node 3 is in turn connected to other networks, such as a wide area network (WAN) 5, e.g. the Internet or backhaul network, in a known manner.

The wireless communication device 1, may for example comprise a laptop, a notebook computer or a pocket personal computer. It is noted that the term "laptop" can refer to a number of classes of small portable computers, for example regular full-size laptops, netbooks, which is a smaller, lighter, more portable laptop, tablet personal computers. Laptops are also denoted notebooks. The invention encompasses all such wireless communication devices.

Figure 2:
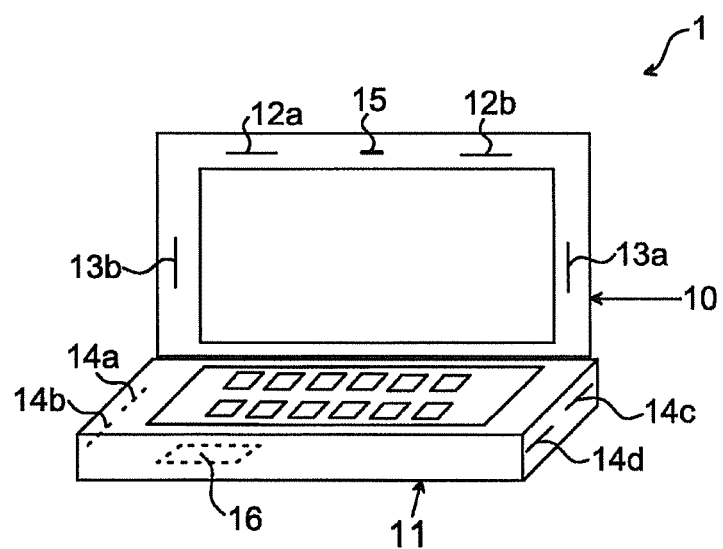
FIG. 2 illustrates a wireless communication device 1 in an embodiment of the invention.

FIG. 2 illustrates a wireless communication device 1 in an embodiment of the invention. The illustrated wireless communication device 1, exemplified as a laptop, has an upper part 10 and a bottom part 11. The upper part 10 comprises one or more transmission antenna device(s) 12a, 12b, 15. The transmission antenna device(s) enable communication, in particular at least the transmission of data. The transmission antenna device(s) may be transmit only antenna devices 12a, 12b or transceiver antennas suitable for both transmitting and receiving data. When a single transmission antenna device 15 is used both for transmission and reception, a duplex filter or a switch is connected between the transmission and reception parts of radio circuitry 16 and the antenna 15 in order to separate the transmission frequencies and the reception frequencies from each other.

The distance between a user using the laptop and the transmission antenna devices 12a, 12b is such that SAR measurements are not an issue. Typically, these are therefore placed in the upper part 10, i.e. the lid, of the laptop. The antenna implementation is designed with this in mind.

The upper part 10 may further comprise one or more reception antenna device 13a, 13b, 15.

In accordance with the invention, the bottom part 11 is provided with one or more reception antennas 14a, 14b, 14c, 14d.

For the illustrated case wherein the wireless communication device 1 is a laptop, all antenna devices are today placed in the lid of the laptop. The lid of the laptop is usually rather thin and the planar implementation of the antenna devices only allows arrangement of the antenna devices so that two different polarizations are provided and can be used. An embodiment of the invention offers improvements in this regards.

The one or more reception antenna devices 14a, 14b, 14c, 14d of the bottom part 11 is, in an embodiment, arranged so as to receive a polarization orthogonal to the polarization of the one or more reception antenna devices 13a, 13b, 15 of the upper part 10. This arrangement of the reception antenna devices 14a, 14b, 14c, 14d of the bottom part 11 in relation to the reception antenna devices 13a, 13b, 15 of the upper part 10 enables the provision of improved reception in that a third polarization for reception can be used.

Existing antenna solutions in laptops of today entail long and flexible cables between the antennas placed in the lid of the laptop and the radio circuitry usually placed under the keyboard of the laptop. Such cables, required to connect the antenna to the radio circuitry, are lossy. Another disadvantage is that at low frequencies, the distance in wavelengths between the antennas in the lid becomes quite small, which reduces the performance due to increased correlation and antenna mutual coupling.

The antenna placement in accordance with an embodiment of the invention provides improvements in the above regards. Placing reception antenna devices in the bottom part 11 requires shorter cables, the distance being only from the receive-only antennas 14a, 14b, 14c, 14d arranged in the bottom part 11 and the radio circuitry 16 also arranged in the bottom part 11. The problems of correlation and antenna mutual coupling are alleviated in that an increased antenna separation is provided. Shorter cables will reduce losses and therefore improve the received SINR (Signal to noise and interference ratio).

A requirement in 3GPP for LTE Advanced is that it should support up to 8×8 MIMO (Multiple input Multiple Output) in downlink and up to 4×4 MIMO in uplink. Therefore future laptops might use 8 receive antennas and 4 transmit antennas. In view of this and as a particular example of an embodiment, if 8 receive antennas and 4 transmit antennas are required in the laptop 1, only 4 antennas need to support both transmission and reception while 4 antennas need only support reception. The 4 antennas that support both transmission and reception are still placed in the upper part 10 (lid of the laptop), as in prior art, in order to avoid SAR measurement requirements for the laptop manufacturers. However, the 4 antennas that only support reception are placed in the bottom part 11 (keyboard part of the laptop). No SAR measurements have to be done with these receive-only antennas 14a, 14b, 14c, 14d as they do not transmit any radiation. Further, as mentioned, the cables that connect these 4 reception antennas 14a, 14b, 14c, 14d to the radio circuitry 16 placed under the keyboard will be shorter than for the other antennas, thus reducing losses and improving the received SINR.

The reception antenna device(s) 13a, 13b, 15; 14a, 14b, 14c, 14d may comprises a microstrip antenna such as a planar inverted F antenna or a rectangular patch antenna, it is however noted that other types of antennas are possible.

In an, embodiment, the reception antenna device(s) 13a, 13b, 15; 14a, 14b, 14c, 14d and the transmission antenna device(s) 12a, 12b operate in a cellular communication frequency band. Other frequency bands may however be used.

The upper part 10 and the bottom part 11 are arranged movably in relation to each other, so that the bottom part 11, in use mode, is closer to the user than the upper part 10.

The upper part 10 and the bottom part 11 of the wireless communication device 1 may be pivotally or slidably fastened to each other. Typical laptops have a joint between the bottom part 11, comprising a keyboard, and the upper part 10 comprising a display. The joint permits the upper part 10 to alter between a closed position wherein the upper part 10 lies flat on the bottom part 11, and an open position, wherein the upper part 10 and the display thereof is visible to the user.

The upper part 10 and the bottom part 11 can be fastened to each other pivotally, by means of a hinge connection. The two parts of a conventional laptop, i.e. lid and keypad, respectively, are typically arranged in such hinge connection. As an alternative, the upper part 10 and the bottom part 11 are slidably fastened to each other, by means of a slide connection. That is, the user pushes the upper part 10 away from the bottom part 11, for the wireless communication device 1 to be in use mode.

The upper part 10, in use mode, may be arranged to be at a distance from the user at which no SAR measurements are required. The requirements when to perform SAR measurements are typically dependent upon regulations stipulated in different countries or regions by different authorities. As an example, Federal Communications Commission (FCC) can be mentioned.

The invention claimed is:

1. A wireless communication device having an upper part and a bottom part, the upper part comprising one or more transmission antenna device(s) and one or more reception antenna device(s), the upper part and the bottom part being arranged movably in relation to each other, so that the bottom part, in use mode, is closer to a user than the upper part, wherein the bottom part comprises one or more reception antenna device(s) arranged to receive a polarization orthogonal to the polarization of the one or more reception antenna device(s) of the upper part, and wherein the bottom part does not comprise any transmission antenna device(s).

2. The wireless communication device as claimed in claim 1, wherein the one or more reception antenna device(s) comprises a microstrip antenna.

3. The wireless communication device as claimed in claim 1, wherein the one or more reception antenna device(s) and the one or more transmission antenna device(s) operate in a cellular communication frequency band.

4. The wireless communication device as claimed in claim 1, wherein the upper part and the bottom part are pivotally or slidably fastened to each other.

5. The wireless communication device as claimed in claim 1, wherein the upper part comprises a lid of a laptop and the bottom part comprises a user input device of the laptop.

6. The wireless communication device as claimed in claim 2, wherein the microstrip antenna is configured as a planar inverted F antenna or a rectangular patch antenna.

7. A wireless communication device having an upper part and a bottom part, the upper part comprising one or more transmission antenna device(s) and one or more reception antenna device(s), the upper part and the bottom part being arranged movably in relation to each other, so that the bottom part, in use mode, is closer to a user than the upper part, wherein the bottom part comprises one or more reception antenna device(s) arranged to receive a polarization orthogonal to the polarization of the one or more reception antenna device(s) of the upper part, wherein all transmission antenna device(s) of the wireless communication device are located in said upper part.

\* \* \* \* \*